Patented Jan. 19, 1932

1,841,828

UNITED STATES PATENT OFFICE

HANS LEEMANN, HEINRICH LIER, AND OSCAR KNECHT, OF BASEL, SWITZERLAND, ASSIGNORS TO CHEMICAL WORKS FORMERLY SANDOZ, OF BASEL, SWITZERLAND

MANUFACTURE OF POLYAZO-DYESTUFFS

No Drawing. Application filed May 31, 1929, Serial No. 367,607, and in Germany June 14, 1928.

It has been found that valuable polyazo-dyestuffs can be obtained by first coupling one molecule of a tetrazotized diamine of the diaryl series in mineral acid solution with one molecule of 1:8-amino napthol-3:6-disulphonic acid, combining the intermediate product with one molecule of a mono diazo-compound and one molecule of a meta amino phenol or its derivatives substituted in the amino group by one or two alkyl-, aryl- or aralkyl-residues.

The new dyestuffs thus produced dye cotton, artificial silk, wool, natural silk and leather in black tints and possess the valuable property of dyeing mixed materials composed of wool, or natural silk and artificial (viscose, cuprammonium silk) in level and equal black shades, whilst the analogous dyestuffs, which are obtained according to the United States patent specification No. 688,478, which contain as final components meta amino benzene, meta amino phenol or meta dihydroxy benzene, dye artificial silk much deeper than wool or silk. The new dyestuffs constitute in form of their sodium salts dark powders which are easily soluble in water with dark violet coloration and dissolve in concentrated sulphuric acid with blue coloration.

The dilute watery solution thereof when boiled with zinc dust is decolorized and this solution becomes in contact with air rapidly blue.

The invention is illustrated by the following example:

Example.—18,4 parts of benzidine are diazotized in the usual manner and coupled in a mineral acid solution with 34,1 parts of the mono sodium salt of 1:8-amino -napthol-3:6- disulphonic acid. When the formation of the intermediate product is finished it is combined in an alkaline sodium carbonate solution with diazobenzene corresponding to 9,3 parts of aniline. As soon as free diazobenzene can no more be traced, a solution of 19,9 parts of N-(orthotolyl)-meta-amino phenol in 400 parts of water and 19 parts of soda lye of 30% strength is added. The coupling takes place quickly and the resulting dyestuff can be precipitated in the usual manner. The new dyestuff has the following formula:

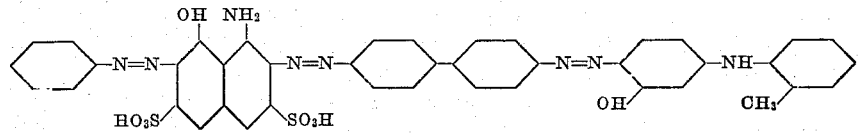

In a dry state it constitutes a dark powder and dissolves in water with dark violet coloration, in concentrated sulphuric acid with blue coloration. Its dilute watery solution when boiled with zinc dust is decolorized, the solution turning rapidly to blue in contact with air. It dyes cotton, artificial silk, wool, natural silk and leather in deep black shades and is suitable for the dyeing of textile materials composed of wool and viscose, which, in a neutral bath, is dyed in equal black shades on both fibres.

In a similar manner the process can be carried out with the tetrazo-compounds of other para diamines of the diaryl series, e. g. ortho-toluidine.

In the place of diazobenzene other mono diazo compounds may be used, e. g. the diazo compounds of toluidines, chloranilines and so on. Furthermore the N-(ortho-tolyl)-meta-amino phenol may be replaced by other N-substituted meta-amino phenols, such as N-ethyl-m-amino phenol, N-diethyl-meta-amino phenol, N-(para-tolyl)-meta-amino phenol and so on. The dyestuffs thus obtained are suitable for the production of level black shades on mixed material composed of wool or natural silk and artificial silk in a neutral bath. They constitute in a dry state, dark powders easily soluble in water with dark violet coloration and dissolving in concentrated sulphuric acid with blue coloration.

What we claim is:—

1. A process for the manufacture of trisazo-dyestuffs, consisting in first combining in mineral acid solution one molecule of a tetrazotized diamine of the diphenyl series with one molecule of 1:8-amino naphthol-3:6-disulphonic acid and then coupling the intermediate product with one molecule of an unsulphonated monodiazo-compound of the benzene series and one molecule of a meta-aminophenol derivative of the formula

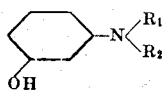

wherein $R_1$ represents alkyl, and an aryl group of the benzene series, and $R_2$ represents hydrogen and alkyl groups.

2. A process for the manufacture of trisazo dyestuffs, consisting in first combining in mineral acid solution one molecule of a tetrazotized diamine of the diphenyl series with one molecule of 1:8-amino naphthol-3:6-disulphonic acid and then coupling the intermediate product with one molecule of an unsulphonated monodiazo-compound of the benzene series and one molecule of a meta-amino phenol, substituted in the amino group by one alkyl and one aryl group of the benzene series.

3. A process for the manufacture of a trisazo-dyestuff consisting in first combining in mineral acid solution one molecule of tetrazotized benzidine with one molecule of 1:8-amino naphthol-3:6-disulphonic acid and then coupling with one molecule of diazo benzene and one molecule of N-(ortho-tolyl)-meta-amino phenol.

4. The herein described trisazo-dyestuffs having the general formula:

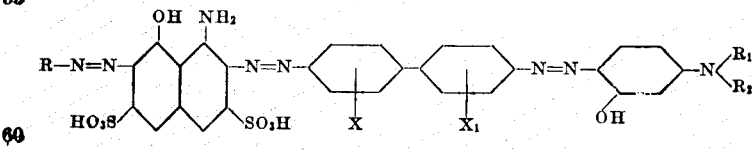

wherein X and $X_1$ represent hydrogen and alkyl groups, R represents an unsulphonated residue of the benzene series and its alkyl and halogen substitution products, $R_1$ represents alkyl and an aryl group of the benzene series and $R_2$ represents hydrogen and alkyl groups, said dyestuffs dyeing cotton, artificial silk, wool, natural silk and leather in black shades and possessing the property of dyeing textile materials composed of wool or natural silk and artificial silk in a neutral bath in equal shades on both fibres, constituting in form of their sodium salts dark powders, easily soluble in water with dark violet coloration and dissolving in concentrated sulphuric acid with blue coloration, their dilute watery solution when boiled with zinc dust being decolorized and this solution becoming rapidly blue in contact with air.

5. The herein described trisazo-dyestuffs having the formula:

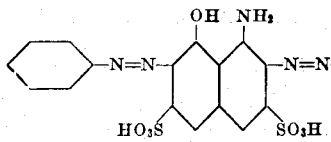 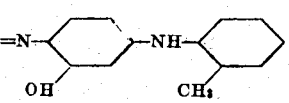

said dyestuffs dyeing cotton, artificial silk, wool, natural silk and leather in black shades and possessing the property of dyeing textile materials composed of wool or natural silk and artificial silk in a neutral bath in equal shades on both fibres, constituting in form of their sodium salts dark powders, easily soluble in water with dark violet coloration and dissolving in concentrated sulphuric acid with blue coloration, their dilute watery solution when boiled with zinc dust being decolorized and this solution becoming rapidly blue in contact with air.

In witness whereof we have hereunto signed our names this 17th day of May, 1929.

HANS LEEMANN.
HEINRICH LIER.
OSCAR KNECHT.